Aug. 19, 1941. F. H. SHERMAN Re. 21,883

FILLER FOR CARTONS OR OTHER CONTAINERS

Original Filed Sept. 11, 1929 4 Sheets-Sheet 1

Inventor:
Francis H. Sherman
by Emery, Booth, Varney & Townsend
Attys

FILLER FOR CARTONS OR OTHER CONTAINERS

Original Filed Sept. 11, 1929 4 Sheets-Sheet 2

Inventor:
Francis H. Sherman
by Emery, Booth, Varney & Townsend
Attys

FILLER FOR CARTONS OR OTHER CONTAINERS

Original Filed Sept. 11, 1929 4 Sheets-Sheet 3

Inventor:
Francis H. Sherman
by Emery, Booth, Varney & Townsend
Attys

FILLER FOR CARTONS OR OTHER CONTAINERS

Original Filed Sept. 11, 1929 4 Sheets-Sheet 4

Inventor:
Francis H. Sherman
by Emery, Booth, Varney & Townsend
Attys

Reissued Aug. 19, 1941 Re. 21,883

UNITED STATES PATENT OFFICE 21,883

FILLER FOR CARTONS OR OTHER CONTAINERS

Francis H. Sherman, Palmer, Mass., assignor, by mesne assignments, to Leon Benoit, New York, N. Y.

Original No. 1,741,741, dated December 31, 1929, Serial No. 391,852, September 11, 1929. Application for reissue February 1, 1941, Serial No. 377,065

17 Claims. (Cl. 229—28)

My present invention relates to so-called fillers or article separators or partitioning elements for use in receptacles or containers for fragile articles such as eggs, and aims to provide improved means of the class described which shall in itself also constitute a carrier or tray-like device adapted to hold the articles independently of the carton, wrapper, case or other container.

In the drawings illustrating certain embodiments of my invention, by way of example:

Figure 1:
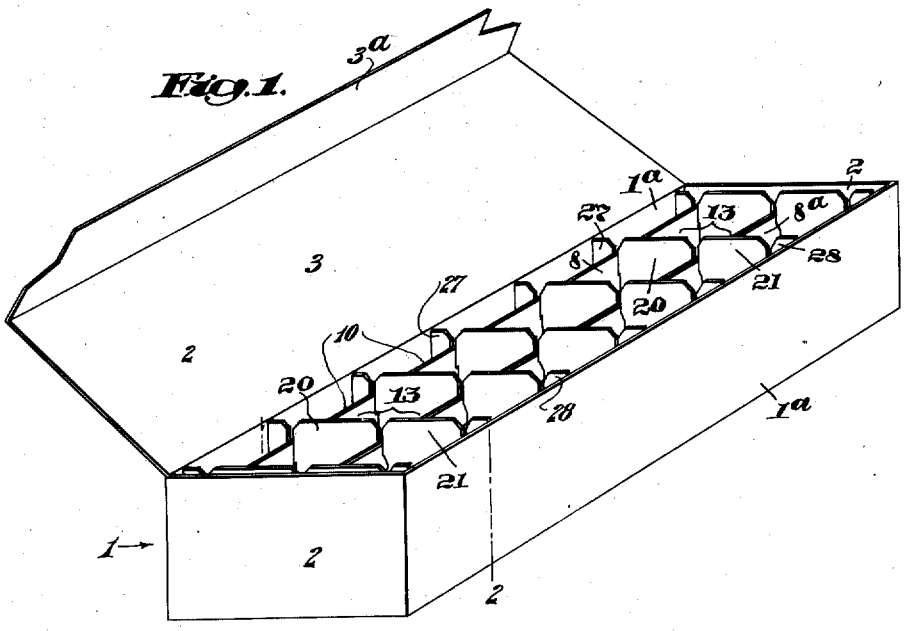
Fig. 1 is a perspective view showing a container, illustrated as a standard egg carton, having a filler embodying my invention positioned therein, in this instance a 2 x 6 filler.
Figure 3A:
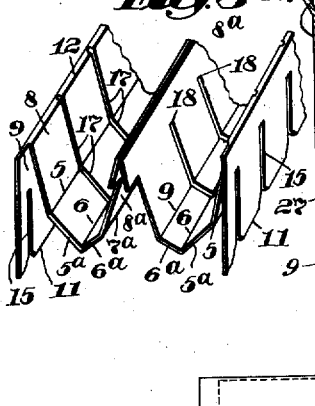
Fig. 3 is a side elevation of one longitudinal element or trough member of the filler of Figs. 1 and 2.
Figure 2:
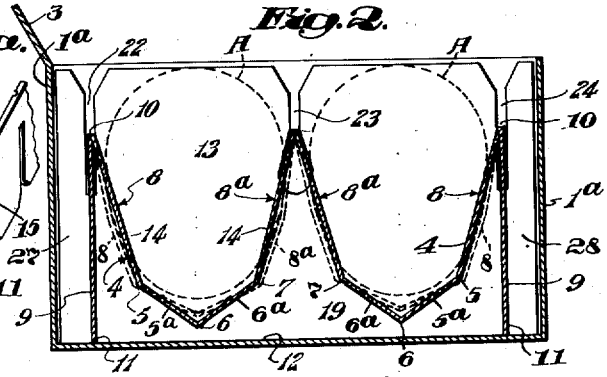
Fig. 2 is a vertical transverse section on the line 2—2 of Fig. 1.
Figure 3:
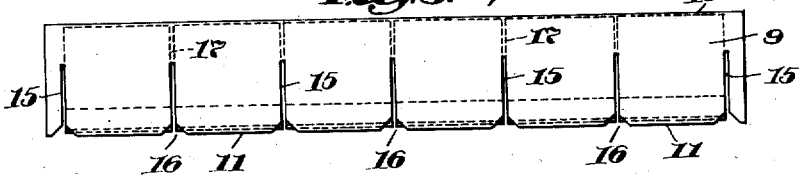
Figure 4:
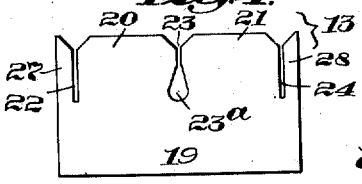
Figure 5:
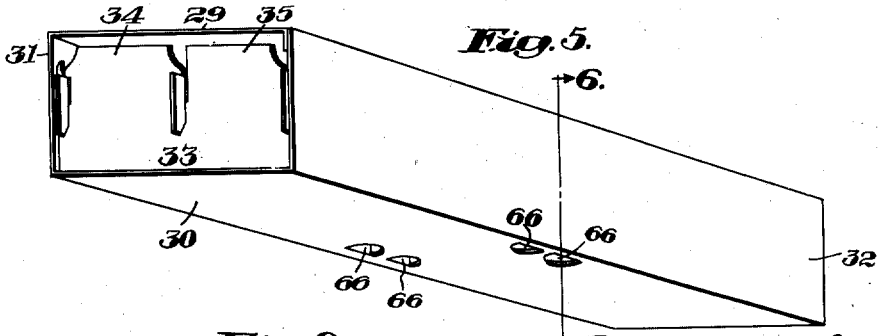
Figure 6:
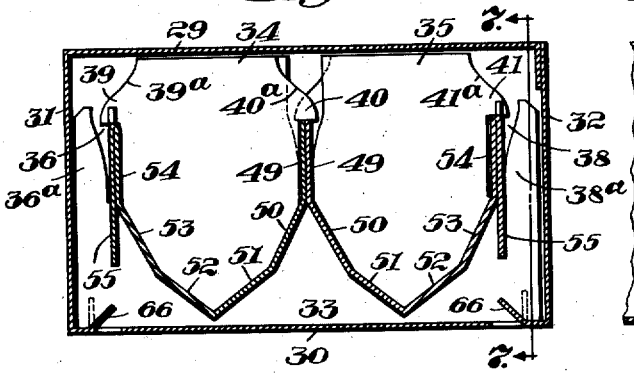
Figure 7:
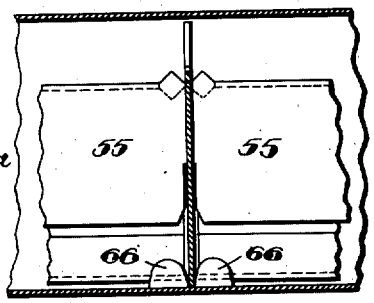
Figure 8:
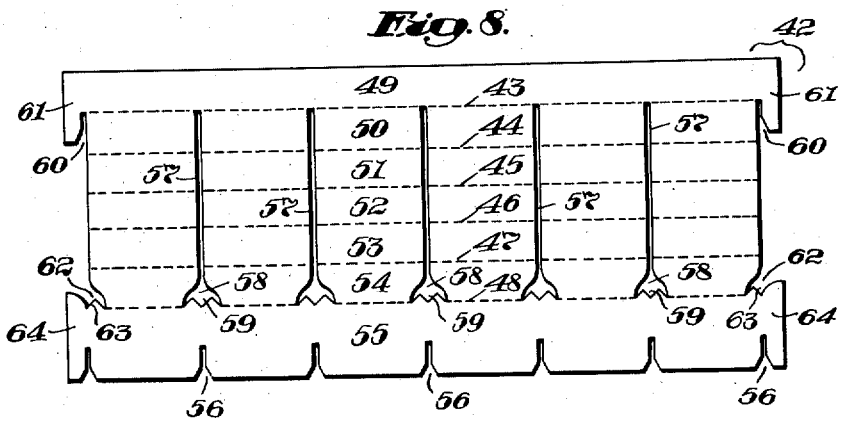
Figure 9:
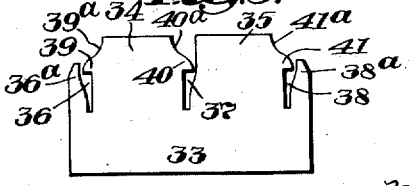
Figure 10:
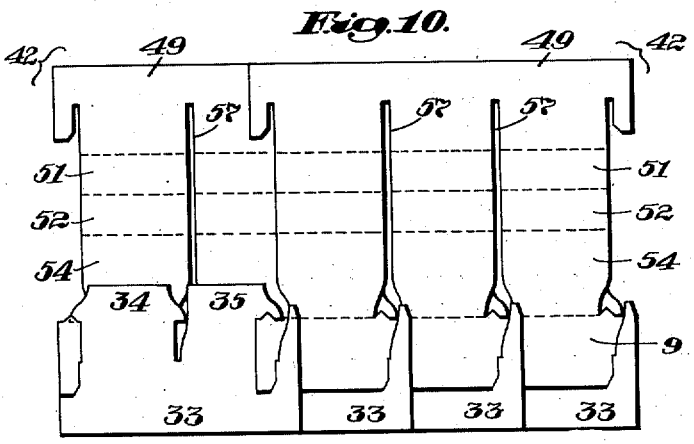

Fig. 3ª is a partial perspective view of two trough or longitudinal elements as in Fig. 3 and positioned as in Fig. 2;

Fig. 4 shows one partition or cross piece of the filler of Figs. 1 to 3;

Figs. 5 to 9 inclusive illustrate a 2 x 6 filler, also embodying the invention, in connection with a different form of receptacle or wrapper, it being noted that the filler of Figs. 5 to 9 is equally adapted for use in a carton such as shown in Fig. 1. In said Figs. 5 to 9:

Fig. 5 is a perspective view, from below, of the receptacle, carton or wrapper with the filler positioned therein;

Fig. 6 is a vertical cross section on the line 6—6 of Fig. 5, corresponding to Fig. 2;

Fig. 7 is a fragmentary longitudinal vertical section on the line 7—7 of Fig. 6;

Fig. 8 shows a blank for forming one of the trough elements or longitudinal members of the filler of Figs. 5 to 7; and Fig. 9 shows a partition or cross piece for the filler of the trough elements as shown in Figs. 5 to 7;

Figs. 10 to 13 illustrate successive stages in the setting up of a filler in accordance with my invention, proceeding from its flattened condition as in Fig. 10, the filler shown being similar to that of Figs. 5 to 9 but of the 2 x 3 size.

Referring first to Figs. 1 to 4, I have there shown by way of example a receptacle or carton 1, in this instance a standard 2 x 6 egg carton, including side walls 1ª, end walls 2, and a cover 3 having a flap or tuck 3ª.

The filler or article carrier, adapted for reception in said carton, comprises one or more longitudinal members, troughs or trough elements indicated as a whole by the numeral 4, see particularly Figs. 3 and 3ª, and a plurality of cross pieces or partitions 13, seen separately in Fig. 4. Depending upon the number of cells and the arrangement thereof desired, any number of the trough elements 4 and of the cross pieces 13 may be employed. In the present instance, that of a 2 x 6 filler, there are two of the former and seven of the latter, to provide twelve cells, in two rows of six each.

Referring particularly to Figs. 3 and 3ª, each longitudinal member or trough 4 is formed from a generally rectangular blank of cardboard or other suitable material. The blank is marked or scored for folding lengthwise along parallel lines 5, 6 and 7 (see also Fig. 2), providing a pair of outer and inner opposed side walls 8 and 8ª respectively, connected by bottom walls or strips 5ª and 6ª. Along the edge of one of the side walls, the side wall 8 of Figs. 2 and 3ª, is a strip 9 hinged to said side wall along the line 10. This strip 9 as illustrated has a width or height greater than that of its attached side wall 8, and has a straight lower edge or base 11 upon which it is adapted to rest, as upon the floor 12 of the carton (see Fig. 2).

The longitudinal members or troughs 4 are provided with suitable formations for interlocking engagement with the several cross pieces or partitions 13. In the outer strips are slots 15 leading in from the free edges of these strips and preferably having flared mouths as indicated at 16. In the side walls 8, 8ª and bottom portions 5ª, 6ª are longer slots 17, in alignment respectively with the several slots 15. These longer slots 17 extend from the upper edge 10 of the outer side wall 8, entirely across said side wall, across both bottom members 5ª and 6ª, and into the inner side wall 8ª, ending short of the free edge of the latter, as at 18.

As best seen in Figs. 2 and 4, each of the cross pieces or transverse partitions 13 comprises a base or bottom portion 19 and a plurality of upper portions 20 and 21 bounded at their sides by vertical slots 22, 23 and 24, preferably with flaring mouths substantially as illustrated. The central slot 23, between the two upper portions 20 and 21, has an enlarged lower end 23ª. Exteriorly of the outer slots 22 and 24 are the spacer portions 27 and 28 respectively, one at each end of the cross piece.

By reason of the above described formations, the longitudinal members 4 and the cross pieces 13 may be readily assembled into their cell-forming relation as shown in Figs. 1 and 2. The upper portions 20 and 21 of the cross pieces are projected through the slots 17 of the side wall and bottom portions of the longitudinal members, while the outer strips 9 of the latter are set into the outer slots 22 and 24 of the cross pieces. In assembled position the bottoms of the slots 22, 24 of the cross pieces abut the upper ends of the slots 15 of the longitudinal strips 9, 9, while the ends 18 of the slots 17 of the trough elements 4 engage the enlarged lower end of the central slot 23 of each cross piece 13. Thus in assembled or set up condition, the filler is ready to receive the eggs or other articles and may be filled therewith either before or after it is placed in the carton.

It will be noted that I have provided a cellular filler or carrier in which each of the cells has a closed bottom, that is, a bottom portion, whether perforate or imperforate, which is capable of carrying an article, the filler being self-supporting and capable in and of itself of holding the series of articles, independently of any external support and irrespective of whether or not the filler is positioned within a carton or the like. The side walls 8, 8ᵃ and the bottom portions 5ᵃ, 6ᵃ interconnecting the latter form in each cell a sling or hammock-like support for the article, readily conforming to the particular contour of the latter and holding it above the plane of the bases 19 of the cross pieces.

The full lines in Fig. 2 show said sling elements, including the side walls 8, 8ᵃ and bottom portions 5ᵃ, 6ᵃ in substantially their position occupied when empty. When an article such as an egg is positioned in any cell of the filler, its engagement with the opposite and downwardly converging side walls 8, 8ᵃ tends to spread or separate the latter at their lower portions and accordingly to draw up the bottom portions 5ᵃ, 6ᵃ, flattening the angle between the two latter portions, and bringing them substantially into a position such as indicated by the dotted lines of Fig. 2. Thus the article is held entirely above the floor of the carton, removing any likelihood of breakage from a blow on the carton floor. The slung side walls 8, 8ᵃ also effectively cushion the sides of the articles, while the upper ends of the latter are kept out of contact with the carton top by the upper portions 20, 21 of the cross pieces. The strips 9 of the longitudinal members additionally cushion the articles between the outer sides of the cells and the adjacent wall of a carton or wrapper in which the filler and its contents is received. These strips also afford additional support and rigidity to the cross members 13.

The self-supporting filler of my invention forms in effect a cellular tray adapted for use independently of any wrapper, carton or other container. For example, a purchaser of a carton with enclosed filler and contents, as shown in Figs. 1 and 2, may, after opening the carton, lift the filler and contents bodily out of the carton, which may then be thrown away while the filler and contents may be conveniently placed for use, as in a refrigerator. It is then unnecessary to open a box each time an article, such as an egg, is to be removed, nor is it necessary to take out all the eggs and place them in a dish for storage in the refrigerator, as is a present common practice. Also, the increased ventilation afforded eggs positioned in my tray-like filler prolongs the time they will remain fresh.

Figure 11:
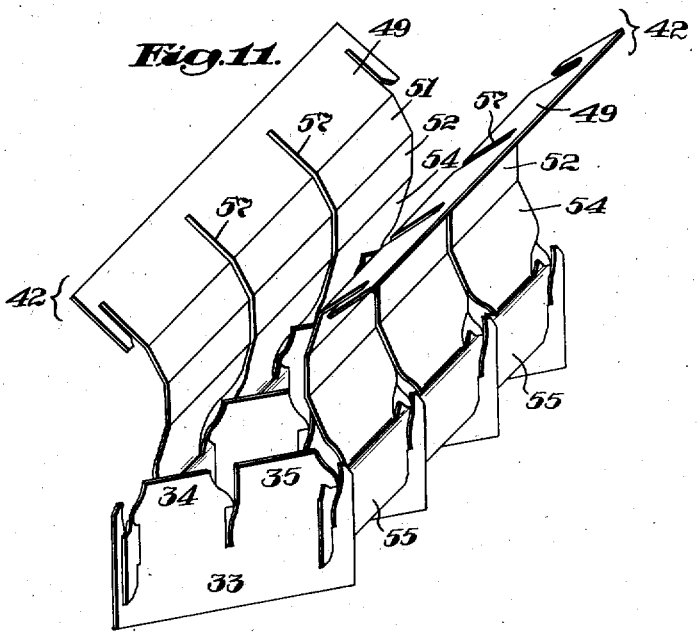

For purposes of packing and shipping the fillers in lots, it will be understood that the filler is readily collapsible and will lie substantially flat, in the manner illustrated in Fig. 10, later to be referred to in detail. The parts may readily be assembled or interengaged by machinery, previous to shipment, and collapsed into the flat position of said figure. In setting up a filler, from its collapsed or flat condition as shown in Fig. 10, it is necessary merely to press it lengthwise in either direction against any suitable stop, which may be the hand of the operator. The two upwardly extending portions of the trough elements seen in Fig. 11, are then grasped along their upper edges, brought together, and pressed downwardly, through the position illustrated in Fig. 12, and into the completely set up and interlocked position of Fig. 13. Thus the tray-filler of my invention can be quickly and easily set up from its collapsed position of Fig. 10, and when so set up is readily inserted or dropped into a standard or other box or carton or a standard 30-dozen egg crate.

Referring now to Figs. 5 to 9, the container there illustrated is of the tubular type, such as fully disclosed and claimed in my Patent No. 1,588,857, dated June 15, 1926, comprising a top wall 29, bottom 30 and opposite side walls 31, 32. The main elements of the filler are similar to those of Figs. 1 to 4. As best seen in Fig. 9 and also in Fig. 6, the cross pieces or partitions comprise each a lower or base portion 33 and upper wall portions 34, 35 bounded at their sides by the slot formations 36, 37 and 38. In this instance, means is provided for positively locking the cooperating portions of the longitudinal members in said slots 36, 37 and 38, comprising, for each of the slots, a hook or shoulder 39, 40 and 41 respectively, formed on and projecting laterally from the upper portions 34, 35 of the cross piece. Above these hooks or shoulders, the parts upon which they are carried are preferably inwardly and upwardly beveled or inclined as indicated at 39ᵃ, 40ᵃ and 41ᵃ respectively, to guide and facilitate the entry of the cooperating portions of the longitudinal members into the slots. The outer slots 36 and 38 are closed at their sides by the upwardly extending tongues 36ᵃ and 38ᵃ.

The blank for one of the longitudinal or trough elements is shown in Fig. 8, being indicated as a whole by the numeral 42. As in Figs. 1 to 4, previously described, this blank is marked or scored lengthwise and along parallel lines for folding into a plurality of strip portions to form the hammock-like trough sides and bottom. The said fold lines are indicated in Fig. 8 at 43, 44, 45, 46, 47 and 48 respectively, dividing the blank into an upper inner wall strip 49, see also Fig. 6, an inner lower side wall strip 50, bottom strips 51, 52, outer lower side wall strip 53, outer upper side wall strip 54 and the exterior strip or reinforcing member 55. Along the free edge of the latter are cut or stamped the slots 56 corresponding to the slots 15 of the filler of Figs. 1 to 4, these also preferably having flaring mouths, to facilitate the assembling of the parts. In alignment with the slots 56 is a second series of slots 57 extending from the hinged edge of the first strip 49 across the blank to the hinged edge of the exterior strip 55. One end of each of these slots is enlarged or belled substantially as indicated at 58, and is desirably formed with a notched or serrated lower wall, as seen at 59, Fig. 8. It will be noted that those portions of the hingedly connected strips 50 to 54 inclusive which lie between the several slots 57 are the portions which will constitute the sling-like side and bottom walls for the several cells, providing for one cell between each adjacent pair of slots and one at each end of the blank. At the two ends of the blank the cell side and bottom wall portions are left free, the blank being cut away centrally rather than merely slotted as between the interior cells. Thus at each end of the blank there is formed a relatively short slot 60, between the adjacent end of the side wall strip 50 and a tongue 61. Opposite these short slots 60, transversely of the blank, the side strip portion 54 is recessed as at 62, including a notched lower portion 63, corresponding substantially to a half portion of the formations 58, 59 for the interior cells, and with a corresponding tongue 64 opposite the tongue 61 at the other side of the blank.

It will be noted that the two walls 49 of the blanks, which occupy adjacent longitudinal positions centrally of the filler, may be readily disengaged from the central slots of the cross-pieces to permit both blanks to be unbent for positioning in planes which substantially coincide with the associated outer slots 36 and 38 of the cross-pieces. When so positioned the filler may be collapsed by a swinging movement which involves a constrained motion of the several cross-pieces and two blanks around two spaced axes which are in substantial coincidence with the outer slots 36 and 38. In the execution of this movement, either for purposes of collapse or, reversely, for erection, there need be no bending of any of the parts. The portion 54 of each blank within the outer slot of the cross-pieces is normally retained there by the hooks or shoulders 39 and 41. In these movements toward collapse or erection the two blanks of the filler are also shifted endwise of each other, and accordingly if opposing forces, as required in these operations, be applied to the outset blank ends, they will be transmitted to the structure as a whole without requiring any manipulation of the cross pieces themselves.

Preferably as a step in the manufacturing operation, the cross members or transverse partitions are partially assembled with the longitudinal members, readily by machinery if desired, and the several parts are collapsed flatwise against each other. For example, in a 2 x 3 filler such as shown in Figs. 10 to 13, the four cross pieces 33 have the two longitudinal members inserted in their respective outer slots 36 and 38, the longitudinal members being brought into position wherein the inner ends of their slots 56 seat upon the inner ends of said slots 36 or 38 of the cross pieces as the case may be. The two longitudinal elements may then readily be swung flatwise against each other into the position illustrated in Fig. 10, the cross pieces pivoting relatively to the longitudinal elements at their points of engagement. When the filler is subsequently to be set up for use, it need merely be picked up, preferably along the upwardly projecting strips 49 of the two longitudinal members, and moved lengthwise against any suitable abutment, for example as illustrated by the arrows in Figs. 10 and 11,—(or the filler may be held stationary and force applied against one of its ends)—sufficiently to square up the cross pieces with respect to the longitudinal members, as in Fig. 12. Downward pressure upon the still free portions of the longitudinal members will now readily bring them into the final position of Fig. 13. The upper portions 34, 35 of the cross pieces 33 project themselves through the slots 57 of the longitudinal members. The latter are forced down until their upper strips 49 snap beneath and are held locked by the central hooks 40 of the cross pieces. The latter are restrained against relative movement lengthwise of the filler by reason of the notched formations 59 and 63 on the longitudinal members which receive the outer hooks 39 and 41 of the partitions. The filler thus completely assembled constitutes a self-supporting tray comprising a plurality of aligned cells, each with four side or vertical walls and a bottom.

When a filler such as illustrated in any of the figures is employed in a tubular wrapper or container as shown in Figs. 5 to 7, it may be retained in the latter in any suitable manner as, for example, by placing seals or stickers across the open end or ends of the wrapper, or by the use of wire stitching, staples or the like as in my patent previously mentioned, the present tubular package and method of forming the same being within the broad scope of claims of said patent. Another simple but extremely efficient means of locking the filler within the tubular or open end carton is illustrated in Figs. 5 to 7. In any desired wall of the tubular carton, for example, the carton top, but in the bottom wall 30 as there illustrated, I have provided a plurality of cutout tabs 66 arranged in pairs at opposite sides of the longitudinal median line of the carton. These tabs are so disposed that when a filler is placed in the carton, one of the partitions or cross pieces 33 will occupy a position between the two tabs 66 of each pair, as best seen in Fig. 7. These tabs, wherever located, may be pressed inwardly in any suitable manner, as by the finger tips, so that they will project into the carton and lie at the opposite sides of the particular adjacent partition, thus effectively preventing longitudinal movement of the filler relative to the carton. If desired, these tabs and the adjacent downwardly projecting side parts 55 of the filler may be of such relative lengths that the tabs will extend behind said parts 55, thus locking the tabs in their filler-holding position. Once the tabs have been pushed in, it is practically impossible to remove them without mutilating them or the carton, making unauthorized opening of the carton, without detection, impracticable. One important advantage in connection with a tubular carton or wrapper such as that of my patent above mentioned and as herein illustrated lies in the saving of approximately 25 per cent of the stock required for the carton or wrapper.

Figure 12:
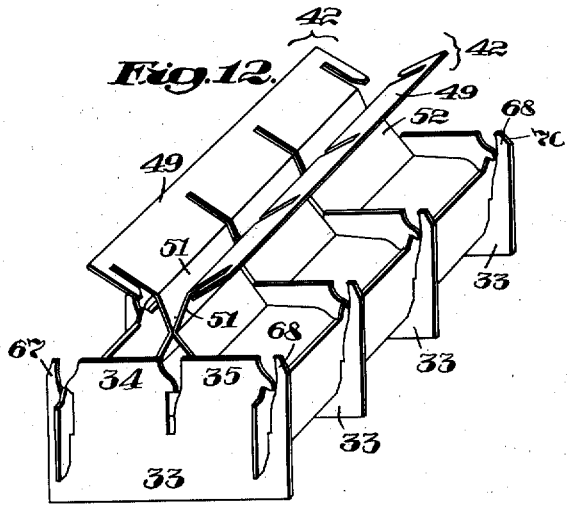
Figure 13:
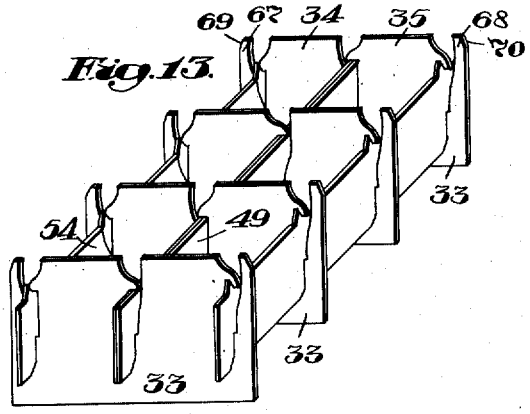

In connection with the foregoing description, it will be understood that the engaging formations for the partitions and the longitudinal elements may be variously modified and the interlocking parts widely varied, either to include or to omit positive locking hooks, shoulders, etc., all within the spirit of my invention. The outer side portions or strips of the troughs or longitudinal elements may be extended downwardly the full depth of the partitions, so as to rest on the carton bottom, as in Figs. 1 to 4, or may terminate short of the carton bottom, as in Figs. 5 to 8. Obviously also, if desired, similar downwardly extending strips may be provided at the opposite side of any or all trough elements. In the construction as shown it will be noted that the inner side portions of the longitudinal members, which are brought together in setting up the filler, see Figs. 12 and 13, provide a double-walled center piece throughout the length of the filler affording additional strength and rigidity. The formation of the cross pieces may also be widely varied, it being noted, for example, that in Figs.

10 to 13 the exterior upwardly projecting tongues 67, 68 are extended upwardly substantially the full height of the portions 34, 35 of their cross pieces, and are bevelled as at 69, 70 to facilitate insertion of the filler in a tubular carton or to assist the reception of the cover tuck of a hinged-cover type of carton, while in Figs. 5 to 9 the tongues 36[a], 38[a] of the cross pieces terminate short of the upper edges of the portions 34, 35.

The filler of my invention is particularly adapted for use in connection with cartons or wrappers for the retail distribution of eggs or other articles, the cartons being either of the 2 x 6, 2 x 3, 3 x 4 or other required form, but is wholly separate from and structurally independent of such receptacle. If additional cells are needed, either lengthwise or transversely of the filler, it is necessary merely to repeat the partition and trough formations for the additional extent desired. The tray-filler as described facilitates an attractive display of the eggs or other articles by a retailer, by merely opening the carton, when the contents are more fully exposed to view than in an ordinary filler, or by removing the filler with its contents and displaying them as upon a counter. For similar reasons the contents themselves are also more readily removable from the cells of the tray-filler.

Since the filler is structurally independent of any carton or wrapper, it does not interfere with or interrupt the flat surfaces of the latter, but leaves them available in their entirety for printing and advertising purposes. Further, the bottomed cells have the advantage that in the event of breakage of a contained article such as an egg, the matter is largely retained in the cell and does not readily seep through to contaminate other cartons which may be adjacent it in a case or crate. However, the filler of my invention largely eliminates breakage, by reason of its strength and the all-round cushioning of the several cells, and particularly at the sides, the ends, and the bottom of the carton or other receptacle.

My invention is not limited to the particular embodiments thereof herein shown and described, its scope being pointed out in the following claims.

I claim:

1. Means for forming a plural-row cellular filler having closed-bottom cells, comprising a plurality of separately formed members which are laterally separable for collapsing the filler, each of said members including parallel hinged strips cooperating with the strips of the other member when the filler is set up to form the side and bottom walls of two rows of cells, and a plurality of cross-pieces to form transverse partitions for the cells substantially perpendicular to said members, said cross-pieces having slot formations extending down from their upper edges to receive the side wall strips of said members, the bottom wall strips of the latter being slotted in line with each cross-piece for the projection of the latter therethrough.

2. Means for forming a plural-row cellular filler having closed-bottom cells, comprising two laterally separable members each including parallel hinged strips to form inner and outer walls and bottom walls of the cells, and a plurality of cross-pieces to form partitions for the cells, substantially perpendicular to said members, said cross-pieces having slot formations extending down from their upper edges to receive the inner and outer wall strips of said members, the bottom wall strips of the latter being slotted in line with each cross-piece for the projection of the latter therethrough, two of the slot formations in the cross pieces being adjacent opposite ends thereof and cooperating with outer side wall strips of the two members to normally maintain the latter against displacement therefrom whereby, said filler may be collapsed into flat condition by relative movements of the inner hinged strip portions of each of said members to widely spaced positions where said spaced members may execute swinging movements about axes substantially coincident with said outer slot formations in said cross-pieces.

3. Means for forming a plural-row cellular filler having closed-bottom cells, comprising two laterally separable members each including parallel hinged strips to form inner and outer walls and bottom walls of the cells, and a plurality of cross-pieces to form partitions for the cells, substantially perpendicular to said members, said cross-pieces having slot formations extending down from their upper edges to receive the inner and outer wall strips of said members, the bottom wall strips of the latter being slotted in line with each cross-piece for the projection of the latter therethrough, two of the slot formations in the cross-pieces being adjacent opposite ends thereof and having swinging connection with the outer wall strips of the two members whereby, said filler may be collapsed into flat condition by relative movements of the inner hinged strip portions of each of said members to widely spaced positions where said spaced members may execute swinging movements about axes substantially coincident with said outer slot formations in said cross-pieces.

4. Means for forming a plural-row cellular filler having closed-bottom cells, comprising two laterally separable members each including parallel hinged strips to form inner and outer walls and bottom walls of the cells, and a plurality of cross-pieces to form partitions for the cells, substantially perpendicular to said members, said cross-pieces having slot formations extending down from their upper edges to receive the inner and outer wall strips of said members, the bottom wall strips of the latter being slotted in line with each cross-piece for the projection of the latter therethrough, and means providing swingable connections between the two members and cross-pieces at points adjacent opposite ends of the latter whereby, said filler may be collapsed into flat condition by relative movements of the inner hinged strip portions of each of said members to widely spaced positions where said spaced members may execute swinging movements about axes substantially coincident with said outer slot formations in said cross-pieces.

5. Means for forming a plural-row cellular filler having closed-bottom cells, comprising a plurality of separately formed members which are laterally separable for collapsing the filler, each of said members including parallel hinged strips cooperating with the strips of the other member when moved together to set up the filler and form the side and bottom walls of two rows of cells, transverse slots therein extending through the hinge of each of said parallel hinged strips of said members, and a plurality of correspondingly slotted cross-pieces extending through the slots of said members, said members and said cross-pieces when so arranged adapted to lie flatwise against each other or to be swung into mutually perpendicular relation and interlocked.

6. Means for forming a plural-row cellular filler having closed-bottom cells, comprising a pair of members each including parallel hinged strips to form inner and outer walls and bottom walls of the cells, transverse slots in each member, and a plurality of correspondingly slotted cross-pieces extending through the slots of said members, said members and said cross-pieces when so arranged adapted to lie flatwise against each other or to be swung into mutually perpendicular relation and interlocked, the interfitting of the cross-pieces and two members being such as to permit disengagement of the two inner walls of the latter from the slots of the cross-pieces whereby the hinged strips of each member may be moved into substantially a single plane remote from the corresponding plane of the other member to constrain execution of swinging movements in such planes of the cross-pieces and members when the filler is erected or collapsed.

7. Means for forming a plural-row cellular filler having closed-bottom cells, comprising a pair of members each including parallel hinged strips to form inner and outer walls and bottom walls of the cells, transverse slots in each member, and a plurality of correspondingly slotted cross-pieces extending through the slots of said members, said members and said cross-pieces when so arranged adapted to lie flatwise against each other or to be swung into mutually perpendicular relation and interlocked, the slots of the cross-pieces being extended downwardly from the top edges thereof one adjacent each opposite end and another at a point intermediately thereof to provide spaces for supporting reception of upper portions of the inner and outer walls of the cells, each intermediate slot receiving the two inner walls of the cells and the two outer slots each receiving one outer wall of the cells in a manner to normally maintain the same against displacement therefrom, the two inner walls when displaced from the intermediate slots being free for movement into spaced planes which are substantially coincident with the associated outer walls to condition the filler for erection or collapse by constrained swinging movements about axes coincident with the outer walls of the cross-pieces and two members.

8. A filler for egg cartons and the like comprising a plurality of separately formed members which are laterally separable for collapsing said filler, each member forming a trough when folded lengthwise into abutting relation, said troughs disposed in parallelism and having transverse slits extending up from their bottoms, cross members for reception in said slits and having cooperating down slits in their top edges, at least one side edge of each trough member having a depending portion for reception in a slit of each cross member, said trough and cross members constructed and arranged to provide a plurality of rows of closed-bottom cells the bottoms of which, when filled, are suspended out of contact with a surface on which the filler rests.

9. The method of forming a filler or carrier for fragile articles which comprises engaging outer edge portions of each of a pair of separately formed cross-slotted and bendable blank members in slits at opposite ends of transverse partition members, bringing said bendable and transverse members into mutually perpendicular relation, with the then free portions of the bendable members extending above or outwardly of the transverse members, and bending said free portions of the bendable members into trough-like form and forcing them downwardly and inwardly between said transverse members and into engagement with each other in slits in the latter.

10. The method of forming a filler or carrier for fragile articles which comprises engaging one edge portion of a cross-slotted and bendable blank member in a slit at one end of each of a plurality of transverse partition members, engaging one edge of another similarly cross-slotted and bendable blank member in a slit at the opposite end of said transverse partition members, bending intermediate portions of each of said blank members downwardly into parallel trough-like forms and bringing the inner free edge portions of each of said blank members into abutting relation adjacent the centers of each of said partition members so that said intermediate portions will extend between said transverse partition members with slots in said blank members and partition members interengaged, whereby said filler or carrier may be collapsed into flat condition by reverse relative movements of the inner free edge portions of each blank member to widely spaced positions where said spaced members may execute swinging movements about axes substantially coincident with the slits at opposite ends of said partition members.

11. An egg filler assembly comprising bendable members having a series of transverse slot formations between their side edges and a matching series of open-ended slots in one side edge, and cross members having slots in their upper edges receiving the slotted portions of the side edges of said bendable members and adapted to be positioned flatwise against the latter or to be swung into position at right angles thereto, in which latter position the unengaged portions of the bendable members may be troughed and bent toward and between the cross members to form therewith a plurality of closed-bottom pockets, the upper portions of the cross members passing through the respective transverse slot formations of the bendable members.

12. An egg filler assembly comprising bendable members having a series of transverse slot formations between their side edges and a matching series of open-ended slots in one side edge, cross members having slots in their upper edges receiving the slotted portions of the side edges of said bendable members and adapted to be positioned flatwise against the latter or to be swung into position at right angles thereto, in which latter position the unengaged portions of the bendable members may be troughed and bent toward and between the cross members to form therewith a plurality of closed-bottom pockets, the upper portions of the cross members passing through the respective transverse slot formations of the bendable members, and means for retaining the several members in said latter or set-up position.

13. A cellular tray for eggs or other fragile articles, particularly adapted for use in place of the ordinary filler of standard egg boxes, comprising a plurality of upright cross-pieces providing opposed walls for the cells, a plurality of trough-like members, one for each row of cells, slotted for supporting engagement by and between the cross-pieces, providing side and bottom walls for each cell and a longitudinal strip along the outer side of each trough-like member, interengaged with the cross-pieces, and forming additional cushioning means between the outer sides of the cells and the adjacent wall of the box in which the filler is received and affording additional strength and rigidity to the cross-pieces.

14. In the formation of a cellular holder for eggs, independent of a carton or other receptacle, upright partitioning and supporting members having down-slits in their upper portions, and a pair of members bending lengthwise into trough-like form, transversely slotted for the passage of said partitioning members and having portions for supporting reception in the down-slits of the latter, the inner side portions of adjacent trough-like members together forming a double-walled element between rows of cells releasably receivable within a single down-slit of each upright partitioning member and adapted, when disengaged from said slits, for movement away therefrom into substantially the same plane as the outer side portions of the trough members whereby to free the holder structure for collapse by swinging movements of its two sets of members about spaced axes in substantial coincidence with the outer side portions of the trough members.

15. A filler comprising a plurality of like cross-pieces and two similar blanks each foldable along parallel bend lines to provide an inner wall constituting a central longitudinal partition, an outer wall, and a connecting wall forming a bottom, the two blanks being formed with parallel slots through which the cross-pieces may be extended for suspension support of the blanks to form therewith a plurality of bottomed cells in double rows, each cross-piece being formed with means at spaced points upon its upper edge for engaging with and normally retaining in position the inner and outer walls of the two blanks but permitting partial disengagement therefrom of the inner walls of the two blanks for movement into planes parallel with the outer walls for collapse of the filler by pivotal movement about spaced axes in substantial coincidence with the outer walls of the blanks relative to the cross-pieces without appreciable bending of either.

16. A filler comprising a plurality of like cross-pieces and two similar blanks each slotted for reception of the several cross-pieces therewithin, each blank being foldable along predetermined lines to provide an inner wall, a bottom and an outer wall, and forming with the cross-pieces a plurality of bottomed cells in double rows, co-acting means on the blanks and cross-pieces for releasably maintaining at a fixed distance apart the inner and outer walls of each blank but permitting disengagement of each inner wall for extension, along with the bottom, into substantially the same plane with the outer wall whereby to condition the filler for collapse by relative swinging movement of all cross-pieces and each blank about widely spaced axes in substantial coincidence with the outer walls.

17. A filler comprising a plurality of like upright cross-pieces each having in its top a central down slot and adjacent its opposite ends other down slots each bordered by an upstanding tongue, and a pair of blanks having registering slots for reception therethrough of the several cross-pieces, each blank being formed with parallel predetermined lines along which bending may take place to provide an inner wall, a bottom wall, and an outer wall the first and last of which are adapted to enter within the central and one end slot, respectively, of the cross-pieces to derive suspension support therefrom, the inner walls of both blanks being entered within the central slots and there supported in closely adjacent relation, the blank slots through which the cross-pieces are received being of sufficient length to permit uplift of the inner walls from the cross-piece slots in which they are entered for disengagement of the inner walls therefrom preliminary to swinging of such walls into substantial alignment with the outer walls of the two blanks, the filler structure, when so conditioned, being collapsible without appreciable bending of any cross-piece or blank by swinging movements of the cross-pieces and blanks about axes which are substantially coincident with the end slots.

FRANCIS H. SHERMAN.